US012770101B2

(12) United States Patent
Xu et al.

(10) Patent No.: US 12,770,101 B2
(45) Date of Patent: Oct. 20, 2026

(54) FINE-TUNING LANGUAGE MODELS TO ASSOCIATE SCANNED TEXT LABELS AND ITEM NAMES

(71) Applicant: Maplebear Inc., San Francisco, CA (US)

(72) Inventors: Bo Xu, San Francisco, CA (US); Jian Li, Santa Clara, CA (US); Shengwen Fang, Vancouver (CA); Chun-Che Wang, Seattle, WA (US); Sumiran Pradhan, Bothell, WA (US); Ying Li, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 81 days.

(21) Appl. No.: 18/651,533

(22) Filed: Apr. 30, 2024

(65) Prior Publication Data

US 2025/0335869 A1 Oct. 30, 2025

(51) Int. Cl.

| | |
|---|---|
| ***G06Q 10/08*** | (2024.01) |
| ***G06F 16/2458*** | (2019.01) |
| ***G06Q 10/0875*** | (2023.01) |
| ***G06Q 30/0601*** | (2023.01) |

(52) U.S. Cl.

CPC ..... *G06Q 10/0875* (2013.01); *G06F 16/2468* (2019.01); *G06Q 30/0635* (2013.01)

(58) Field of Classification Search

CPC ........... G06Q 30/0633; G06Q 10/0875; G06Q 10/0635; G06Q 10/087; G06Q 30/0631; G06Q 30/0635; G06Q 30/0641; G06Q 30/0201; G06Q 30/0202; G06Q 30/0625; G06N 20/00; G06N 3/08; G06N 3/09; G06N 5/022; G06N 3/045; G06N 20/20; G06N 3/084; G06N 5/01; G06F 16/2468; G06F 16/3329; G06F 40/30; G06F 16/3344; G06F 40/20; G06F 16/24578; G06F 16/248; G06F 16/9024; G06F 16/2455; G06F 16/9535; G06T 7/0002; G06V 30/10

See application file for complete search history.

(56) References Cited

U.S. PATENT DOCUMENTS

| | | | | |
|---|---|---|---|---|
| 6,976,000 | B1 * | 12/2005 | Manganaris | G06Q 30/0204 705/7.33 |
| 8,015,140 | B2 * | 9/2011 | Kumar | G06Q 10/04 706/46 |
| 10,943,139 | B2 * | 3/2021 | Leizerowich | G06F 16/334 |
| 11,257,049 | B1 * | 2/2022 | Durazo Almeida | G06V 30/413 |
| 12,406,478 | B2 * | 9/2025 | Janousková | G06V 10/774 |
| 12,417,486 | B2 * | 9/2025 | Bronicki | G06Q 30/06 |

(Continued)

*Primary Examiner* — Florian M Zeender
*Assistant Examiner* — Milena Racic
(74) *Attorney, Agent, or Firm* — Fenwick & West LLP

(57) ABSTRACT

An online system trains a language model to generate an association between receipt labels and item names, enabling the online system to identify discrepancies between receipt labels and item names. The online system identifies training label-name pairs from a plurality of orders including a set of item names and associated receipt labels, wherein the training label-name pairs are optimized based on fuzzy matching and/or statistical association scores. The online system fine-tunes the language model to perform tasks for translating between receipt labels and item names or scoring receipt labels and item pairs based on statistical association.

14 Claims, 9 Drawing Sheets

(56) References Cited

U.S. PATENT DOCUMENTS

| | | | | |
|---|---|---|---|---|
| 2012/0330971 | A1* | 12/2012 | Thomas | G06N 20/00 707/748 |
| 2021/0406816 | A1* | 12/2021 | Dearing | B07C 3/18 |
| 2022/0318315 | A1* | 10/2022 | Wyle | G06V 30/1448 |
| 2023/0156158 | A1* | 5/2023 | Moyne | H04N 23/60 348/159 |
| 2025/0307896 | A1* | 10/2025 | Scheibelhut | G06Q 30/0633 |
| 2026/0148576 | A1* | 5/2026 | Zang | G06V 10/774 |

* cited by examiner

FINE-TUNING LANGUAGE MODELS TO ASSOCIATE SCANNED TEXT LABELS AND ITEM NAMES

BACKGROUND

This disclosure relates generally to ordering an item through an online concierge system, and more specifically using language models to associate receipt labels and item names by the online concierge system.

In online concierge systems, pickers fulfill orders at a physical warehouse, such as a retailer, on behalf of customers as part of an online shopping concierge service. In current online concierge systems, pickers may be sent to various warehouses with instructions to fulfill customer orders for items, and may then find items included in customer orders in a warehouse. In many cases, a picker may also fulfill multiple orders in one visit to the warehouse, such that the picker may collect orders related to multiple orders at one time and separately complete each order (e.g., checking out/paying at the warehouse for each order). As such, for various reasons the ordered items may or may not match items actually collected (and subsequently delivered) for each order. Pickers may collect items that differ from the ordered items or items in addition to the ordered items, pickers may replace unavailable items (e.g., items that are out of stock) with available items (which may not be reflected in an update to the order), and items may become mixed across multiple orders (an item collected for a first order may be checked out or otherwise associated with the items for a second order).

Additionally, automatically matching the ordered items to the items fulfilled by the picker for each order based on an order's receipt may be prone to errors. Many warehouses may not synchronize fulfilled orders with the online concierge system and may only provide a picker with a printed receipt on checkout. Waiting for delivery of the order to identify problems or other discrepancies may rely on purchasers' correct identification of errors and limit corrections that could be made if the picker was near the warehouse when the error was identified. Analysis of a receipt for an order may be difficult because item descriptions on a receipt (i.e., how an item is labeled on a receipt, termed a receipt label) may vary significantly due to labeling conventions across warehouses or retailers, or may otherwise deviate from items as described for customer orders while still correctly fulfilling the customer order. These may make it difficult to quickly identify whether a customer order has been correctly fulfilled.

SUMMARY

An online concierge system determines whether customer orders are correctly fulfilled by using a computer model to translate between receipt labels and item names. A receipt (e.g., a printed receipt from a warehouse) is captured as an image and is sent to the online concierge system. The receipt image is analyzed with a text recognition algorithm (e.g., optical character recognition (OCR)) to determine a set of receipt labels that describe fulfilled items according to the description as it appears on the receipt for a particular retailer. The receipt labels in many cases may not initially have a known correspondence to items as described in databases of the online concierge system, such as item names and other data related to the ordered items. Though generally discussed herein as relating to receipt labels, the approaches discussed herein may be generally applied to other types of varying text, such as other scanned text having a correspondence with item names.

To determine an association between receipt labels and item names, a language model is fine-tuned to translate from a receipt label domain (as items are described on receipts) to/from an item name domain (as items are described in the online system). Unsupervised training data is automatically generated by predicting associations between domains and trimming infrequent associations. The online concierge system identifies a plurality of orders and associated information to generate the training data. Each of the orders includes a set of item names, as represented on the online concierge system, and a receipt image that may be processed to extract a set of receipt labels. For each order, the online concierge system determines a set of optimized label-name pairs. The set of optimized label-name pairs represents pairings of receipt labels and item names that generate a highest overall fuzzy matching score for the order.

The online concierge system determines statistical association scores (e.g., pointwise mutual information (PMI) scores) describing a likelihood that a receipt label in the label-name pair occurs alongside the item name in the label-name pair relative to other sets of optimized label-name pairs across the plurality of orders. The label-name pairs are trimmed or filtered based on the statistical association scores to remove associations that occur infrequently, while associations that occur more frequently are selected to be included in the training data for fine-tuning the language model.

Once the language model is fine-tuned, the online concierge system applies the language model to new customer orders and/or receipt images received for customer orders to determine whether the customer order is correctly fulfilled. The language model may be applied to a customer order including a set of item names to translate to predicted receipt labels, or may be applied to a receipt image including a set of receipt labels to translate to predicted item names. Alternately, the language model may receive a customer order including a set of item names and a receipt image including a set of receipt labels to determine a pair score representing a likelihood that the customer order is correctly fulfilled, with a low pair score representing potential discrepancies between the items in the customer order and the items actually fulfilled by the picker. Discrepancies may then be flagged by the online concierge system, e.g., for manual review, further processing, or the like, so that incorrectly fulfilled orders or other errors can be quickly identified and addressed.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
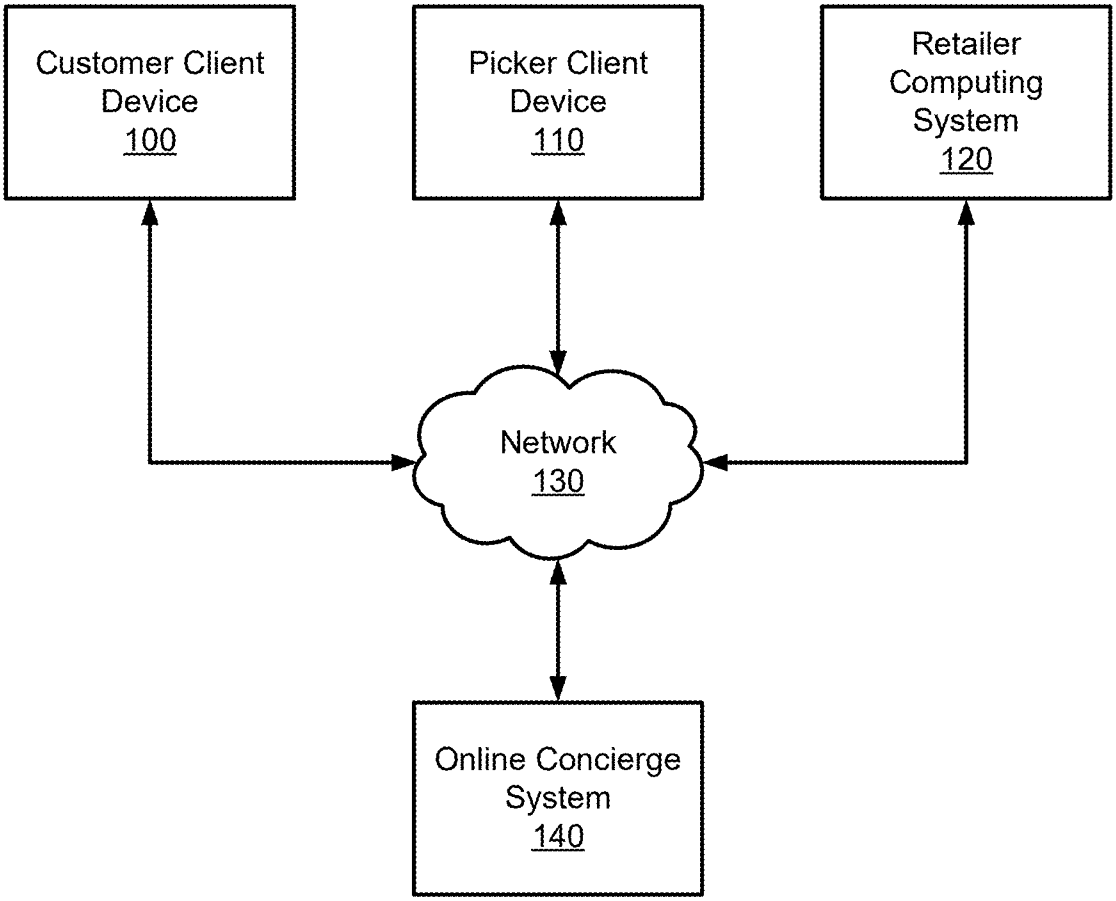
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item names (e.g., a stock keeping unit (SKU) or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item name encoded in a barcode coupled to an item. The picker client device 110 compares this item name to items in the order that the picker is servicing, and if the item name corresponds to an item in the order, the picker client device 110 identifies the item as collected. In some embodiments, rather than or in addition to using a barcode scanner, the picker client device 110 captures one or more images of the item and determines the item name for the item based on the images. The picker client device 110 may determine the item name directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

The picker may also receive a receipt from the retailer location and use the picker client device to capture an image of the receipt and provide the receipt (e.g., a receipt image) to the online concierge system 140. As discussed further below, the online concierge system 140 extracts label receipt labels from the receipt and may use language models to determine what items were actually purchased based on the receipt. When the purchased items (as determined from the receipt image) differ from the ordered items (or vice versa), the online concierge system 140 may identify a discrepancy for correction.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
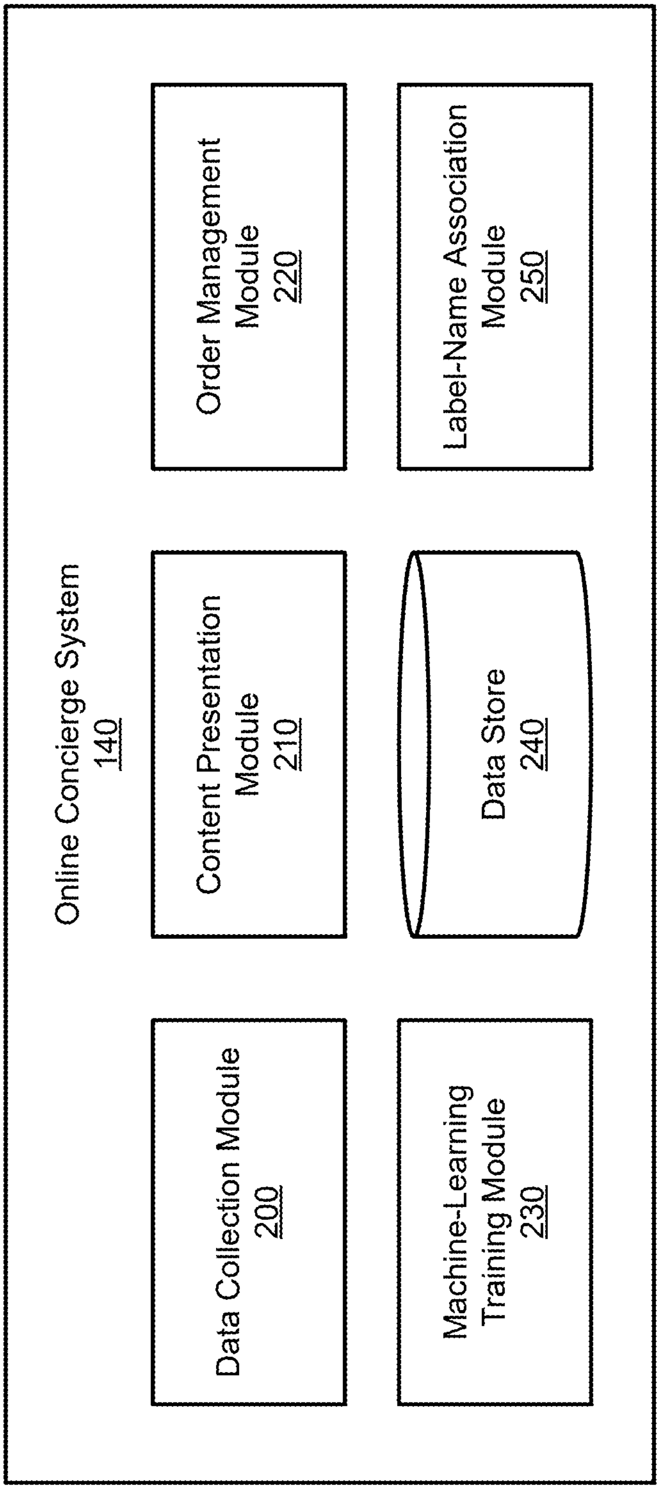
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, and a label-name association module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item names for items that are available and may include quantities of items associated with each item name. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item names for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item names for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of the order. In some embodiments, the order management module 220 computes an estimated time of arrival of the picker to the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, hierarchical clustering, and neural networks. Additional examples also include perceptrons, multilayer perceptrons (MLP), convolutional neural networks, recurrent neural networks, sequence-to-sequence models, generative adversarial networks, and transformers. A machine-learning model may include components relating to these different general categories of model, which may be sequenced, layered, or otherwise combined in various configurations.

Each machine-learning model includes a set of parameters. The set of parameters for a machine-learning model are used to process an input and generate an output. For example, a set of parameters for a linear regression model may include weights that are applied to each input variable in the linear combination that comprises the linear regression model. Similarly, the set of parameters for a neural network may include the respective weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes a set of input data for which machine-learning model generates an output. For example, each training example may include customer data, picker data, item data, or order data. In some cases, the training examples also include a label which represents an expected output (i.e., a desired or intended output) of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model, whereby the machine-learning training module 230 updates parameters of the machine-learning model based on each of the set of training examples. The training examples may be processed together, individually, or in batches. To train a machine-learning model based on a training example, the machine-learning training module 230 applies the machine-learning model to the input data in the training example to generate an output with a current set of parameters. The machine-learning training module 230 scores the output from the machine-learning model using a loss function. A loss function is a function that generates a score for the output of the machine-learning model, such that the score is higher when the machine-learning model performs poorly and lower when the machine learning model performs well. In cases where the training example includes a label, the loss function is also based on the label for the training example. Example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory computer-readable media. The data store 240 uses computer-readable media to store data, and may use databases to organize the stored data.

Translating Receipt Labels and Item Names

The online concierge system 140 includes a label-name association module 250 that translates receipt labels and item names to determine whether customer orders are fulfilled correctly. The label-name association module 250 receives customer orders placed through the online concierge system 140 including items requested by customers and/or images of receipts associated with customer orders, e.g., an image of a printed receipt from a warehouse or retailer upon completion of a purchase, a scan of a receipt, an upload of a digital receipt, or the like. The label-name association module 250 identifies receipt labels from the images of receipts. The label-name association module 250 may initially coordinate training (e.g., fine-tune) of a language model for determining matches/correspondences between receipt labels and item names. The label-name association module 250 may then use the language model to translate between the item names to the receipt labels and vice versa, such that the label-name association module 250 may determine predicted item names from receipt labels of an image of a receipt, predicted receipt labels from item names of a customer order, or may compare receipt labels and item names to identify potential discrepancies between the fulfilled items of the order (as listed in the receipt) and the ordered items (specified in the customer order). In some embodiments, the label-name association module 250 may analyze each order and/or receipt received by the online concierge system, or may sample a subset of orders and/or receipts to be analyzed. In other embodiments, the label-name association module 250 may analyze orders and/or receipts received by the online concierge system responsive to a request by a user, e.g., a customer or a picker, of the online concierge system to confirm that a particular customer order is fulfilled correctly.

When images of receipts are received, the label-name association module 250 applies a text recognition algorithm, such as optical character recognition (OCR), to a receipt image to determine a set of receipt labels on the receipt. The receipt labels describe picked items as it appears on the receipt for a particular retailer (as extracted by the text recognition algorithm). In some examples, receipt labels may include a quantity (e.g., 2 units, 12 oz., or other size or quantity metrics) of the purchased item in addition to the description, or may include other information describing the purchased item, such as price of the purchased item. In some embodiments, the label-name association module 250 may additionally include one or more other image processing algorithms to be applied to receipt images, such as to brighten or sharpen receipt images that may otherwise be difficult for text recognition algorithms to process.

In many cases, the way that a particular ordered item appears on a receipt may not be directly known by the online concierge system 140. Warehouses may not provide information about receipt labels to the online concierge system 140, and receipt labels for an item may differ in notation across different warehouses or warehouse locations.

The label-name association module 250 applies a language model to translate/match items as described in receipt labels (e.g., in a "receipt label" domain) and as item names as ordered (e.g., in an "item name" domain as specified in the database of the online concierge system). The language model is fine-tuned to perform various tasks for translating between a receipt label domain and an item name domain. For example, the language model may be trained to generate predicted receipt labels from item names of a customer order, predicted item names from receipt labels from an image of a receipt, or to evaluate correspondence between receipt labels to item names by calculating a pair score for the receipt labels and item names to determine discrepancies that may indicate a customer order was fulfilled incorrectly.

In some embodiments, the label-name association module 250 selects a task to be performed by the language model based at least in part on available information about a particular customer order. The language model may additionally be trained to perform other tasks to identify discrepancies between a customer order and an associated receipt image. Training and/or fine-tuning the language model are discussed further in conjunction with FIGS. 4, 5A-B. In other embodiments, language models may be trained by one or more third-party systems or servers, such as by a retailer system. The label-name association module 250 may use a single language model for all retailers and/or warehouses of the online concierge system 140. Alternately, language models may be associated with particular retailers or warehouses, a particular location or instance of a retailer or warehouse, or may be generalized to one or more retailers or locations of retailers. The language model may be stored in the data store 240 of the online concierge system 140, or may be stored or hosted remotely for access by the online concierge system 140.

Based on the output of the language model, the label-name association module 250 evaluates whether the item names correspond to the receipt labels for the customer order. The comparison may identify that predicted item names generated by the language model correctly correspond to the set of receipt labels, that predicted receipt labels generated by the language model correctly correspond to the set of item names, or that a pair score generated by the language model based on the receipt labels and item names is higher than a threshold value (e.g., that the item names of a known customer order and the receipt labels of a provided receipt image correspond to a pair score indicating a likely match between the requested and fulfilled items). When the label-name association module 250 identifies one or more of these conditions, the label-name association module 250 determines that the customer order was fulfilled correctly. When these conditions are not met, the label-name association module 250 may determine that the customer order was fulfilled incorrectly or that one or more other actions should be taken, e.g., to confirm whether the customer order was fulfilled or to correct the incorrect fulfillment.

While discrepancies may represent a customer order being fulfilled incorrectly (e.g., a picker selecting an incorrect item at a warehouse), a picker fulfilling an item at a warehouse that was not on the customer order, or multiple customer orders getting mixed together, discrepancies may also occur under other circumstances than an incorrectly fulfilled customer order. For example, the label-name association module 250 may identify a discrepancy when the language model is incorrect, e.g., is outdated as to the current stock of a retailer, has not had sufficient training data to correctly translate between a receipt label and an item name, or the like.

When a discrepancy is identified, the label-name association module 250 may identify the customer order for manual review by an administrator of the online concierge system 140, a picker associated with the customer order, or a customer associated with the customer order. The label-name association module 250 may transmit an alert to a device of a picker associated with the customer order (e.g., a text message notification, an email, and/or an automated phone call). The label-name association module 250 may also determine that the apparent discrepancy is an error (e.g., if a user indicates that the apparent discrepancy is not a mistake for the order and provides a correct label-name pair) and may retrain (e.g., further fine-tune) the language model by the machine-learning training module 230 using updated or additional training data.

Figure 3A:
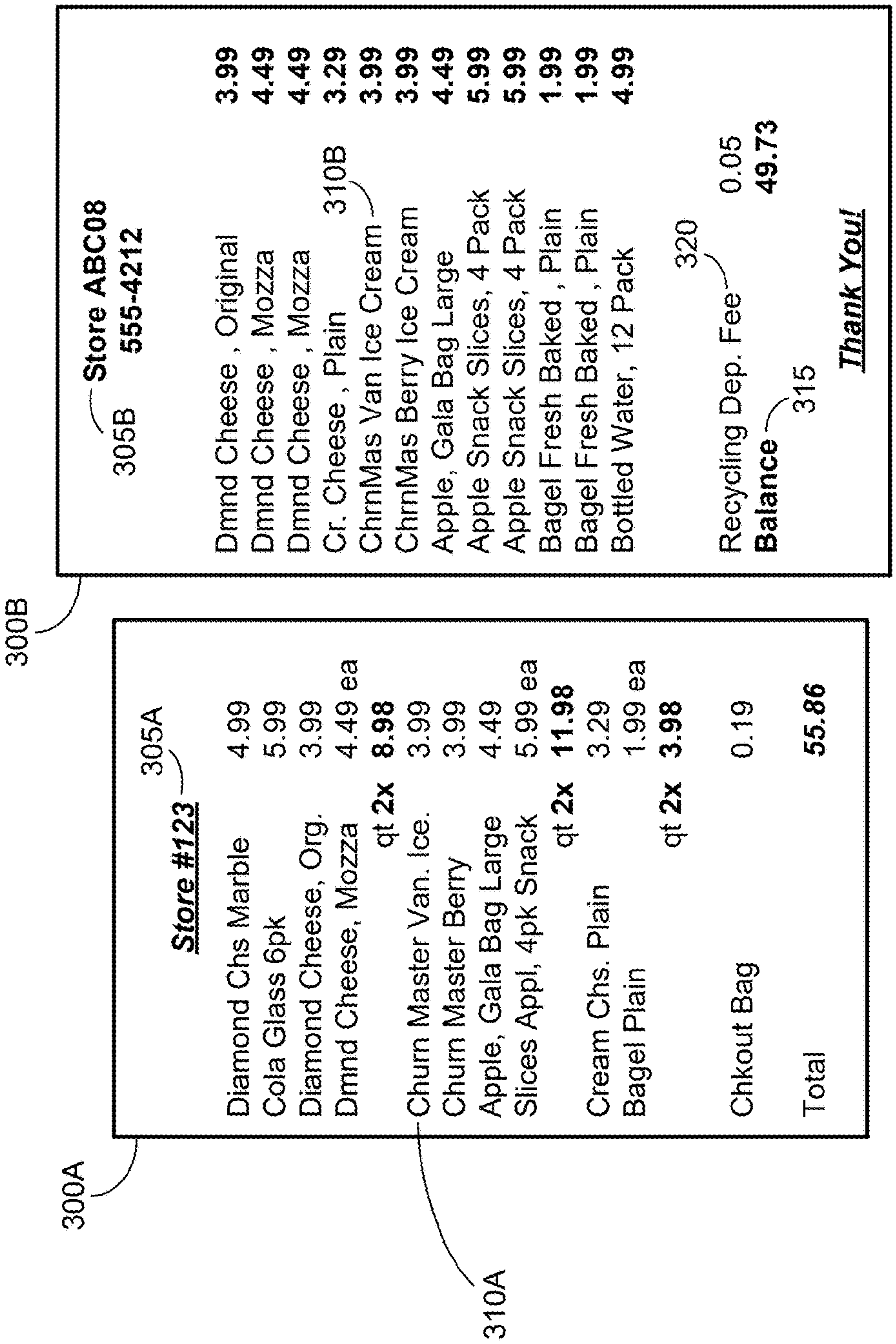
FIGS. 3A-C illustrates example receipts corresponding to customer orders for an online concierge system, in accordance with one or more embodiments.

FIG. 3A illustrates example receipts corresponding to customer orders for an online concierge system, in accordance with one or more embodiments. Each receipt 300A, 300B includes a set of receipt labels corresponding to items purchased by a picker of an online concierge system 140 to fulfill one or more customer orders. Receipts associated with different retailers, as in the example receipts 300A, 300B, may differ in the type, amount, and formatting of information presented on the receipts. Additionally, the type, amount, and formatting of information presented on receipts may not directly match information stored by the online concierge system 140.

In the example of FIG. 3A, a first receipt 300A is associated with a first retailer 305A, and a second receipt 300B is associated with a second retailer 305B. Each item of the set of receipt labels may additionally be associated with other information, such as a price corresponding to the item, a quantity of the item purchased, discounts applied to the item, a category of the item, or the like. Further, each receipt 300A, 300B may include additional elements, such as retailer information, bagging or other fees 320, transaction totals 315, or the like, which may be in different positions or labeled differently across different retailers.

Although similar or identically purchased items may be presented on receipts 300A, 300B, receipt labels may differ for item descriptions between retailers and/or warehouses. For example, "Churn Master Vanilla Ice Cream" is represented as "Churn Master Van. Ice." 310A in the first receipt 300A, and as "ChrnMas Van Ice Cream" 310B in the second receipt 300B, but both receipt labels 310A, 310B may correspond to an identical item associated with a single ordered item name on the online concierge system 140. To ensure that the online concierge system 140 can correctly identify whether customer orders are fulfilled, both "Churn Master Van. Ice." 310A and "ChrnMas Van Ice Cream" 310B should correspond to the ordered item name "Churn Master Vanilla Ice Cream" on the online concierge system 140. That is, the same ordered item from the perspective of a customer or user may appear differently on receipts from different warehouses, such that effectively determining how different receipt labels correspond to different ordered items by a model may be difficult to automatically determine.

Figure 3B:
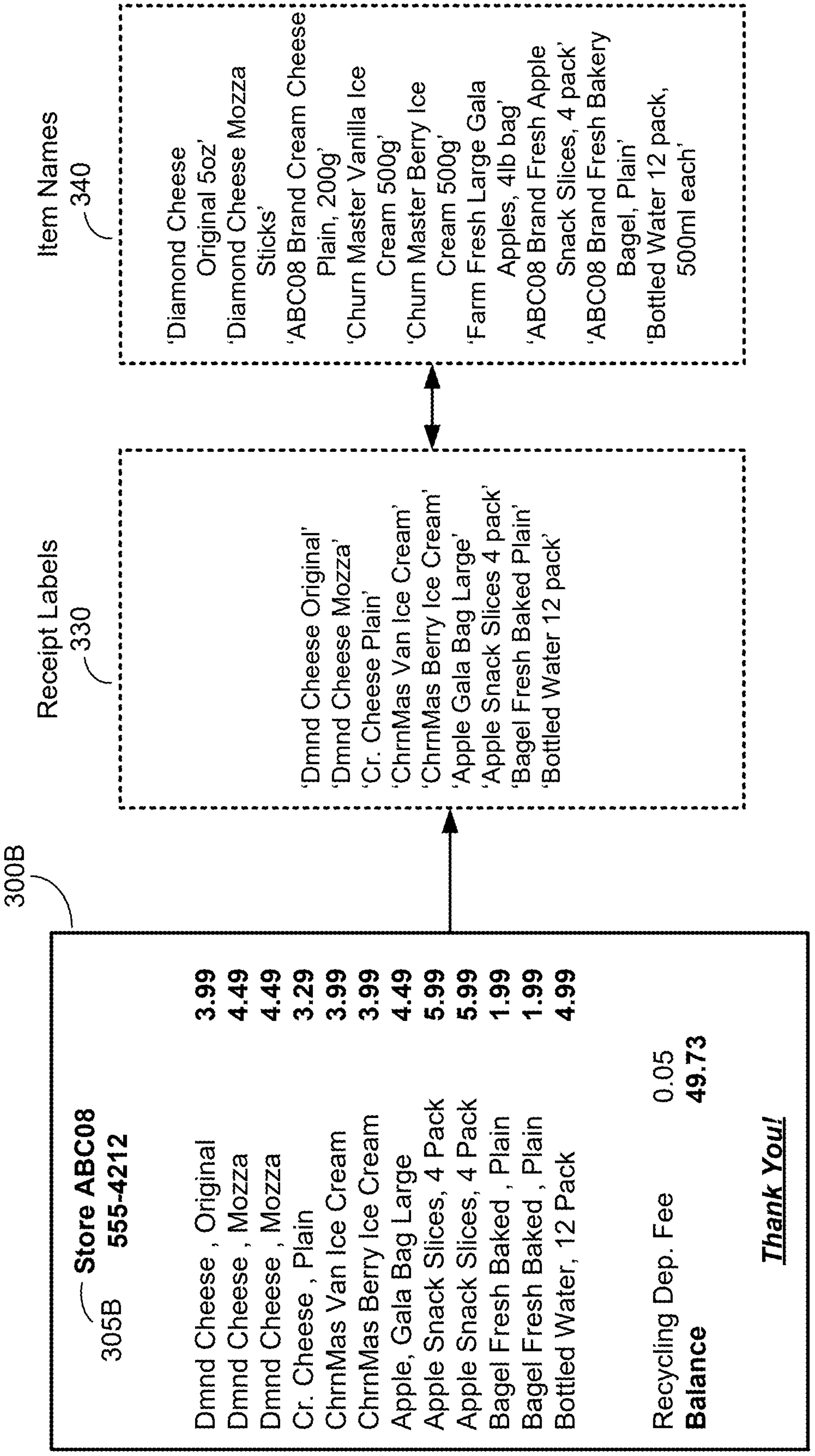

FIG. 3B illustrates an example process for analyzing receipts to identify receipt labels for comparison to item names. The online concierge system 140 analyzes the example receipt 300B with text recognition (e.g., optical character recognition (OCR) or another process for segmenting and recognizing text from a receipt) to determine a set of receipt labels 330. In some embodiments, the online concierge system 140 may additionally identify one or more of a quantity associated with each receipt label of the set of receipt labels (e.g., "4 pack," "12 pack," or "12 oz."), a price associated with each receipt label of the set of receipt labels, or other information identified from the receipt in association with the receipt labels. In other embodiments, the online concierge system 140 parses the receipt labels to separate it from additional information. As shown in the example of FIG. 3B, the receipt text "Cr. Cheese, Plain 3.29" may be parsed by the online concierge system 140 as receipt label "Cr. Cheese Plain" and a value of "3.29" associated with the receipt label.

Typically, receipt labels 330 differ from the name or description of item names 340 as stored by the online concierge system 140. In many cases, the receipt labels 330 may be shortened or condensed, and in some cases, may be substantially different from the name of an item for the item names 340. Thus, some receipt labels 330 may correspond more directly to item names 340 than others, while others deviate more substantially from item names. In this example, the receipt label 330 for "Cr. Cheese Plain" corresponds to an item name 340 "ABC08 Brand Cream Cheese Plain, 200 g" on the online concierge system 140, while the receipt label for "Bottled Water 12 pack" corresponds to an item name "Bottled Water 12 pack, 500 ml each."

For the online concierge system 140 to accurately determine whether receipt labels 330 fulfill a customer order having order item names 340, the online concierge system 140 translates receipt labels to the order item names, including those that deviate in format, language, or label from order item names as stored by the online concierge system as shown.

Figure 3C:
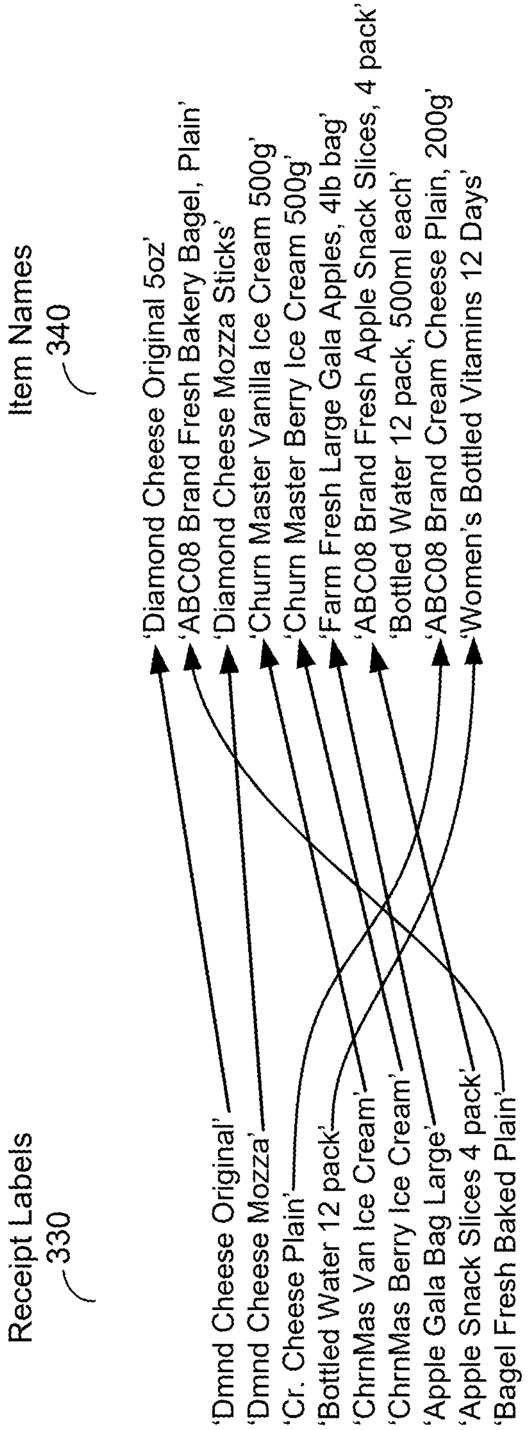

FIG. 3C illustrates an example of matching pairs of receipt labels and item names for customer orders. The online concierge system 140 pairs receipt labels 330 with item names 340 to create label-name pairs. A label-name pair represents a likely correspondence between the receipt label 330 and the item name 340 within the label-name pair, such that the receipt label appearing on an image of a receipt associated with a customer order including the item name indicates that the customer order of that item was correctly fulfilled. As shown in the example of FIG. 3C, the receipt label 330 "Dmnd Cheese Original" on a receipt image is paired to item name 340 "Diamond Cheese Original 5 oz" in the online concierge system 140. As such, if a customer order includes the item name "Diamond Cheese Original 5 oz" and a receipt image submitted by a picker for the customer order includes the receipt label "Dmnd Cheese Original," the online concierge system 140 determines that the item was correctly fulfilled for the order.

In some embodiments, the online concierge system 140 may generate label-name pairs for determining unsupervised training data or to evaluate pairs to maximize an overall score for evaluating correspondence across the set of receipt labels 330 and the set of item name 340. As discussed below, potential label-name pairs may be scored with a fuzzy-matching algorithm or with a pair score generated by a computer model to determine the label-name pairs for a customer order and the corresponding receipt image. Scores may be determined for each potential pair of receipt labels 330 and item names 340. For example, scores may be generated for the label-name pair of "Dmnd Cheese Original" and "Diamond Cheese Original 5 oz," but also for the potential label-name pairs of receipt label "Dmnd Cheese Original" with item names "ABC08 Brand Fresh Bakery Bagel, Plain," "Dmnd Cheese Original" and "Diamond Cheese Mozza Sticks," "Diamond Cheese Original," "Churn Master Vanilla Ice Cream 500 g," and so forth. Scoring for receipt labels and item names are discussed further below. The scoring may then be used to determine an optimal set of label-name pairs for a receipt and corresponding order that most likely (based on the scores) describes a correct correspondence between receipt labels and ordered item names.

To improve language modeling for receipt labels and item names without undue human intervention, existing orders and receipts may be analyzed to automatically identify receipt label-item name pairs for training (or fine-tuning) a language model. A set of receipts and associated orders are identified to generate label-name pairs as training data automatically (e.g., as "unsupervised" training data). This training data may be generated based on the associated orders and receipts, optimizing the most-likely pairs for each order and pruning label-name pairs that infrequently occur, enabling the training data to be automatically generated while removing potentially erroneous pairs.

Figure 4:
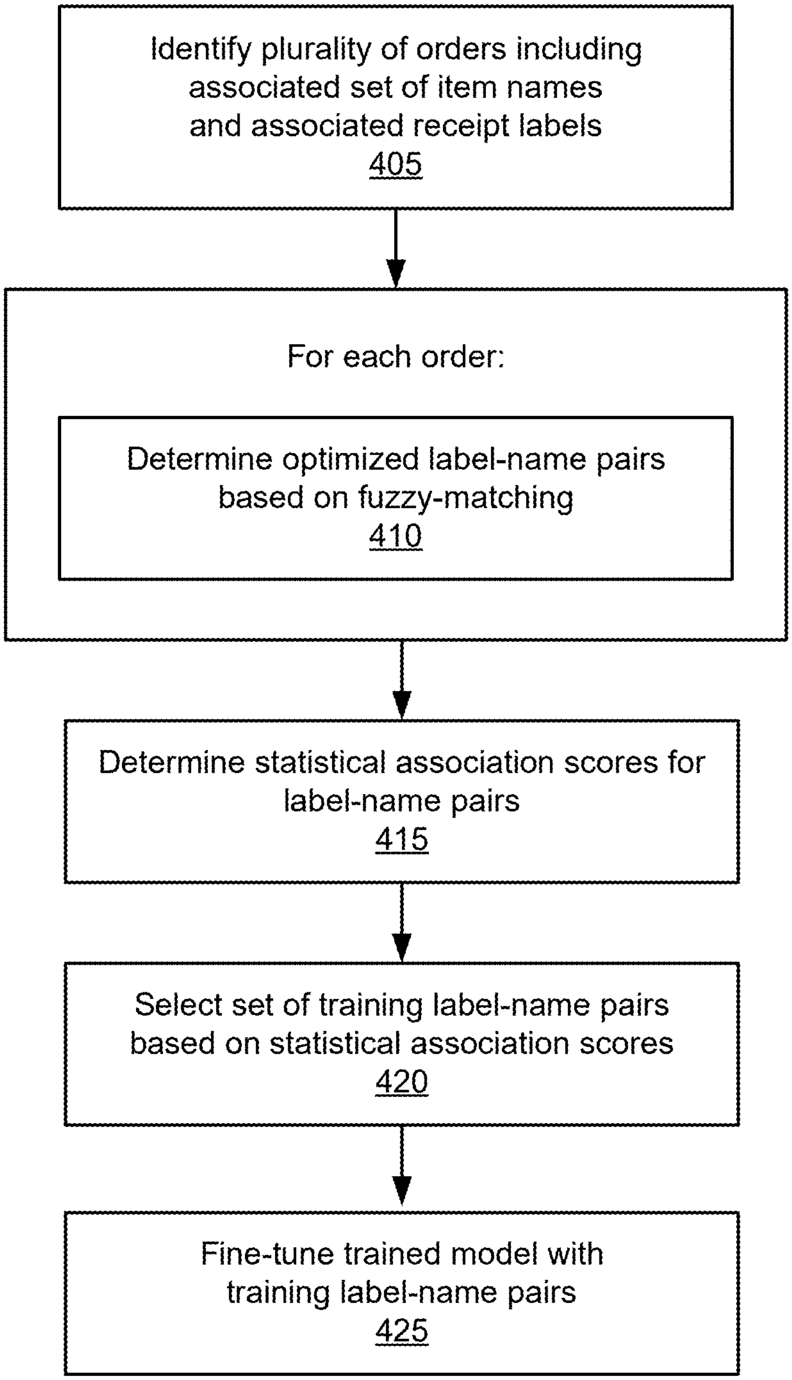
FIG. 4 is a flowchart for training a language model to translate between receipt labels and item names, in accordance with one or more embodiments.

FIG. 4 is a flowchart for training a language model to translate between receipt labels and item names, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., online concierge system 140). Additionally, each of these steps may be performed automatically by the online concierge system without human intervention.

The online concierge system 140 trains and/or fine-tunes a language model to translate between receipt labels and item names to identify discrepancies that may indicate customer orders are incorrectly fulfilled. In some embodiments, the language model is a large language model (LLM). The language model may be a transformer, autoencoder, or any other suitable machine-learning model that may learn effective correspondence in one domain to another domain (here, receipt items to item names) and may learn tokens, token order and quantity, and other characteristics for inputting and/or outputting data (e.g., tokens or embeddings) in the respective domains. The model may be trained (at least initially) with training data that may not include customer order information. For example, the language model may initially be trained based on a general corpus of language information, and from the perspective of the online concierge system 140, may be pre-trained with parameters for general language applications. These may include model parameters as well as encodings for individual terms, such as word embeddings or tokens, or other data representations used by the model. The model may then be fine-tuned (i.e., parameters are further trained) with receipt label and item name pairs (label-name pairs) to specifically improve performance of the model for the receipt label and item name domains. This permits the language model to learn contextual relationships between languages that, with the structure of item names and receipt labels associated with customer orders, may be used to translate between item name and receipt label domains based on the learned relationships from the general language training data. In some embodiments, the language model may be further trained (e.g., fine-tuned) using customer order information including item names and receipt labels.

Initially, a plurality of orders is identified 405 that may be used for training (fine-tuning) the language model. The orders may include, e.g., a set of orders associated with a particular warehouse or retailer, and may include orders within a particular timeframe (e.g., the prior month) for which a receipt image (and associated item names) are available. In addition, the plurality of orders may also exclude orders that may be unsuitable for training, such as orders in which no receipt was provided, orders that were not satisfactorily fulfilled (e.g., has a problem with the delivery, missing items, or otherwise may not represent appropriate correspondence between ordered items and receipt labels), or orders for which the number of items on the receipt do not match the number of ordered items. In general, the selection of the orders may be made automatically, such that the training data used in fine-tuning the model may generally be automatically determined by the system, enabling minimized user interaction with training label-name pairs.

To train the language model, a set of relevant label-name pairs is automatically generated based on similarity between receipt labels and item names while filtering infrequently-occurring pairs that are potential errors. Initially, for each order (e.g., an order and its associated receipt), a set of optimized label-name pairs are determined 410, such that the most-likely label-name pairs for each order are determined.

Figure 5A:
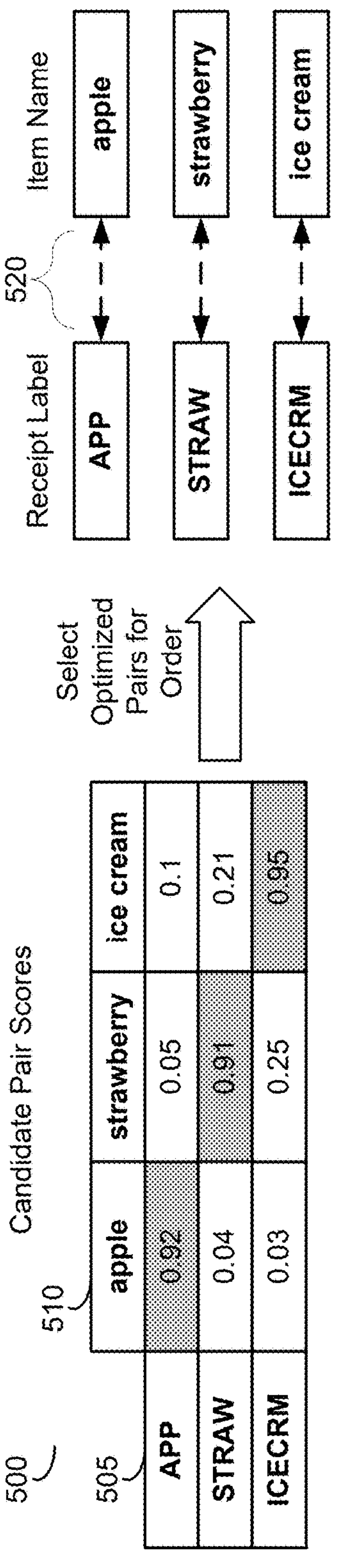
FIGS. 5A-B show generating label-name pairs for an order, in accordance with one or more embodiments.
Figure 5B:
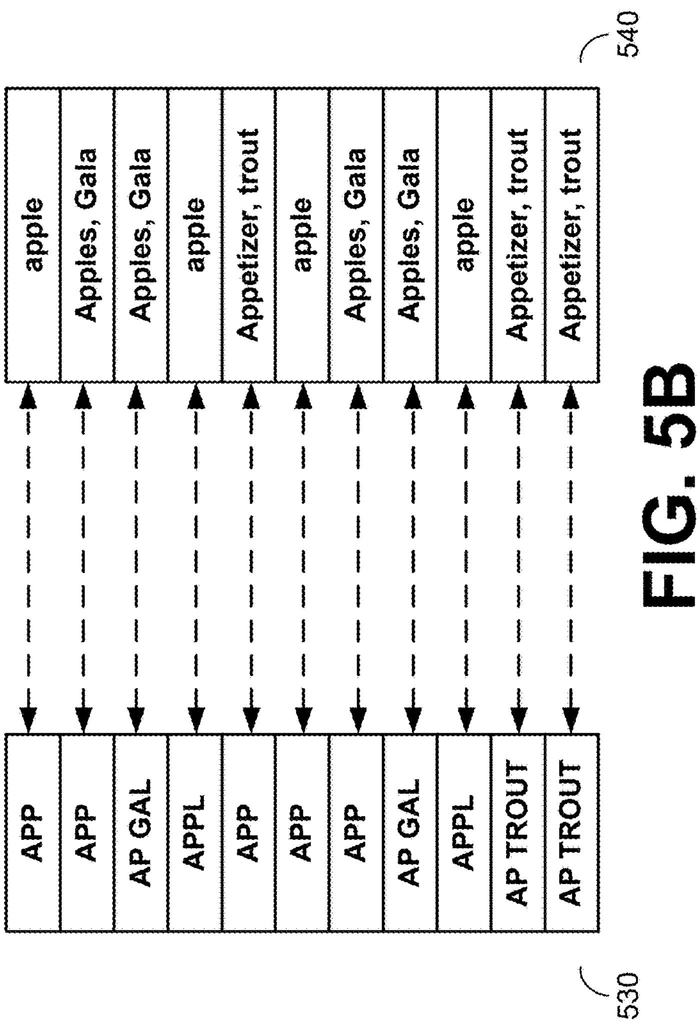

FIGS. 5A-B show generating label-name pairs for an order, in accordance with one or more embodiments. In the example of 5A, an order includes item names 510 of "apple," "strawberry," and "ice cream" and the scanned receipt includes receipt labels 505 of "APP," "STRAW," and "ICECRM." Each of the item names 510 and receipt labels 505 may be scored relative to one another as represented in a score matrix 500. The scoring may be any suitable scoring based on the similarity of an item name to a receipt label. In one or more embodiments, the scoring is a fuzzy matching algorithm that evaluates the character similarity and order between two text strings, such that the more similar the string as measured by characters and character order, the more similar the item name and receipt label, the higher the pair is scored. This fuzzy scoring may include other "fuzzy logic" for scoring similarity between strings, and may account for changed and/or missing characters between the strings, such that similar but not identical strings can be compared according to their estimated similarity.

For example, the item name of "ice cream" and receipt label of "ICECRM" share the same characters in the same order and scores relatively highly (0.95) in this example. In some embodiments, each item name 510 is scored with respect to each receipt label 505 (e.g., every pair is evaluated), for example, to form a complete score matrix 500. In further examples, the pairs may be filtered to exclude strings with an apparently low scoring value, such as scores with no matching characters in a threshold number of characters. In further embodiments, when a score from the scoring algorithm is below a threshold (e.g., 0.25), the score may be set to zero or otherwise reduced to a low value.

Based on the matching scores across receipt labels and item names, label-name pairs 520 for the order may be selected as the most-likely pairs for that order (i.e., the set of ordered items and the set of receipt labels). As each item may correspond to one item on the receipt, each item name and each receipt label may be selected once for the optimized label-name pairs 520. As such, the label-name pairs 520 are selected based on the candidate pair scoring of the score matrix 500. The pairs may be selected in various ways, such as a greedy algorithm (sequentially selecting the highest-scoring pairs for label/names that have not been selected) or to maximize the overall score of the selected label-name pairs 520. For example, in some instances an item name or receipt label may have a moderate or high score for multiple different pairs and because each item name or receipt label may be selected once for a pair, the optimized score across all pairs may not always use the highest scoring pair related to a particular item name/receipt label. In some instances, the pairing may also exclude pairing with a matching score below a threshold (e.g., below 0.25).

By determining the label-name pairs 410 (as shown in FIG. 5A), the system may automatically determine likely matches, for each order, according to the matching algorithm (e.g., with a fuzzy matching algorithm). Across a plurality of orders, a large number of resulting label-name pairs may appear at different frequencies. FIG. 5B shows an example of a set of receipt labels 530 paired with a set of item names 540 as optimized across a large number of orders. As shown in the example of FIG. 5B, receipt items and label names having a variation of "AP" in the receipt label 530 may be optimized to match various items in the item name 540, including different types of apples or appetizer. Because the label-name pairs are generated as an optimization of the scoring (e.g., fuzzy matching), the label-name pairs may include label-name pairs that are incorrect relative to the "true" matching of receipt items and item names. The complete set of label-name pairs from the plurality of orders may thus include a number of label-name pairs that may be incorrect.

Returning to FIG. 4, to prune the label-name pairs that were automatically generated from the orders, the label-name pairs as determined from the individual orders may then be statistically analyzed to determine the frequency (or relative frequency) that label-name pairs occur and/or that particular receipt labels or item names occur with respect to particular pairs. For example, in FIG. 5B, the receipt label "APP" occurs in label-name pairs corresponding to the item names "apple," "Apples, Gala," and "Appetizer, trout." In this example, "APP" least frequently occurs in association with "Appetizer, trout." This may represent, for example, a selected pair optimization based on word similarity that does not correspond to a "true" correspondence between a receipt label and an item name.

To automatically account for the possibility of these erroneous pairings, statistical measures may be determined 415 for the label-name pairs. The statistical measures may determine the frequency that particular labels appear with respect to particular names (and vice versa) to determine whether the particular names/labels occur in label-name pairs at least a threshold frequency across orders. As one example, the statistical measure may include determining co-occurrence or pointwise mutual information scores. When a label-name pair has a statistical measure below a threshold, the pair may be removed from a potential training set. Said another way, the system may select 420 a set of training label-name pairs based on the statistical association scores, such as the scores above a threshold. As one example, the label-name pairs may be selected that have a pointwise mutual information score higher than zero (i.e., positively correlated higher than random chance).

Using the selected set of training label-name pairs, the language model may then be fine-tuned 425 to specifically train the model with data relating receipt labels to item names. Because the selected pairs can be automatically generated from a set of orders and corresponding ordered items and receipt labels, while excluding pairs likely to be statistical errors, the training data may automatically be generated to fine-tune the model for receipt-item correspondence. In addition, the process for selecting these pairs may also be tolerant of various receipt formats and errors in character recognition for the receipt, enabling effective pairs to be selected across merchants and with unreliable or inconsistent receipt images (e.g., that may yield variations in extracted receipt labels even when the receipt itself includes the same printed text). In further embodiments, the selected training label-name pairs may be further adjusted by additional automated or manual means to further refine the label-name pairs used for training (fine-tuning) the language model.

Figure 6A:
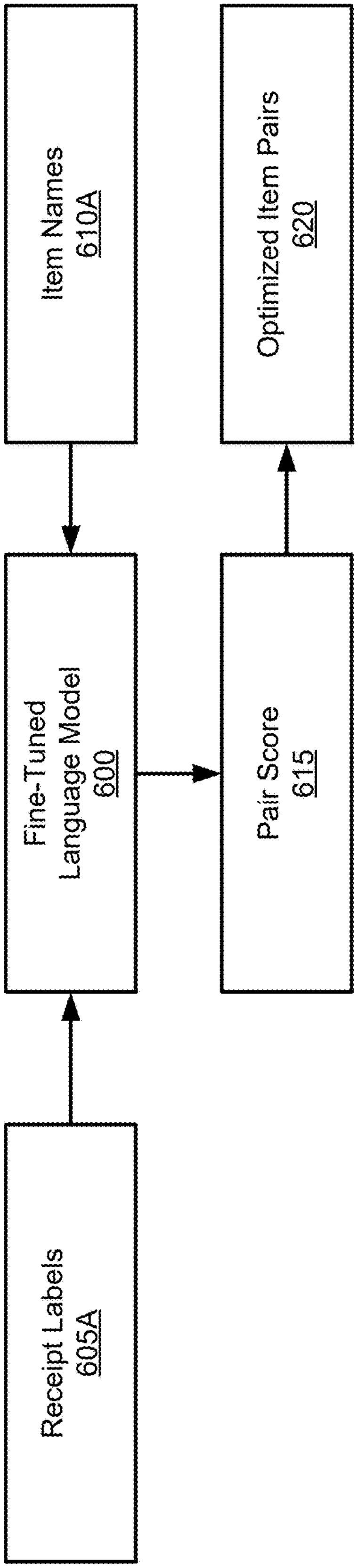
FIGS. 6A-C are examples for applying a fine-tuned language model to translate between receipt label and item name domains to identify discrepancies in customer orders, in accordance with one or more embodiments.
Figure 6B:
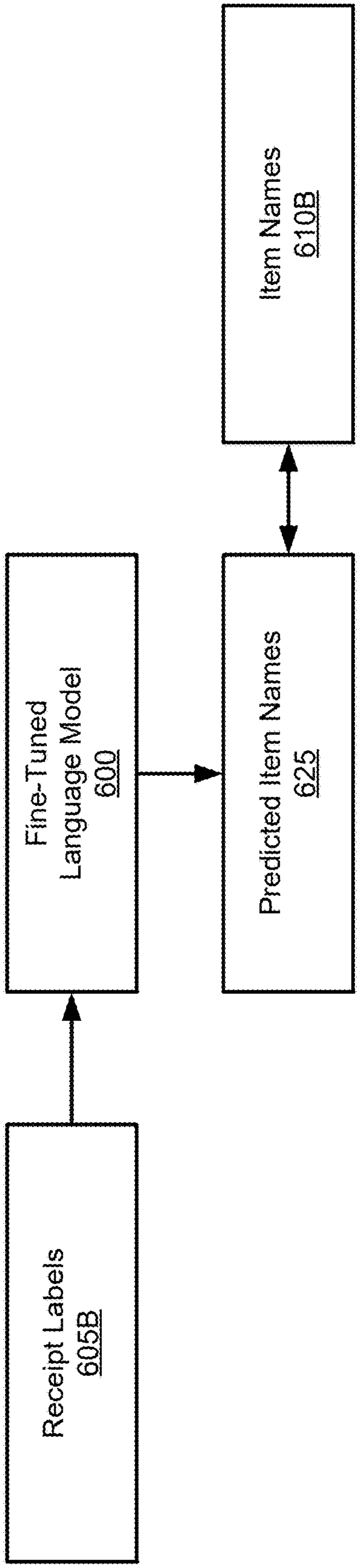
Figure 6C:
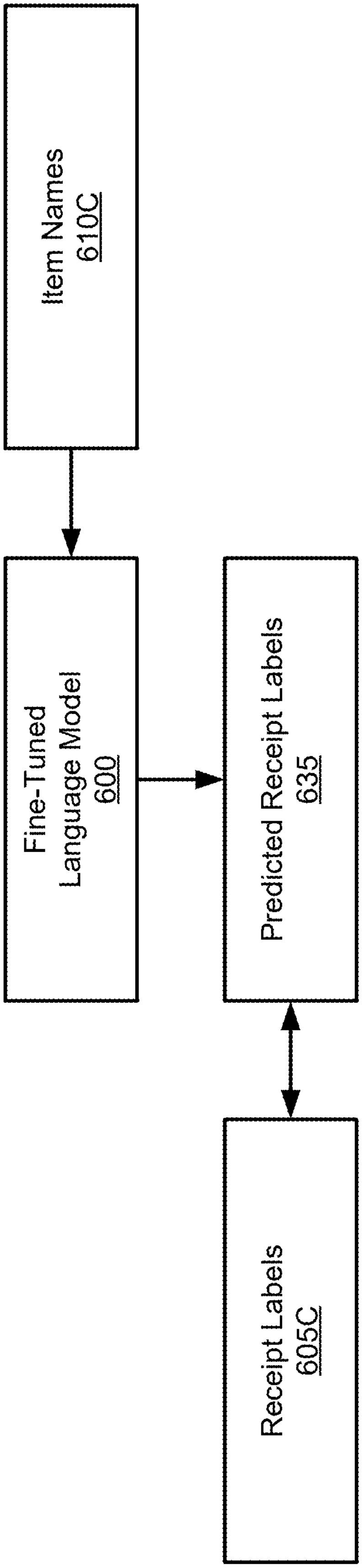

FIGS. 6A-C are examples for applying a fine-tuned language model to translate between receipt label and item name domains to identify discrepancies in customer orders, in accordance with one or more embodiments. The online concierge system 140 may train the fine-tuned language model to perform several tasks for managing orders with the language model. In other embodiments, the online concierge system 140 may apply the fine-tuned language model to perform other tasks than described herein, or may evaluate outputs of the described tasks differently.

FIG. 6A is an example for applying a fine-tuned language model 600 to determine whether a set of receipt labels 605A correctly fulfills a customer order including a known set of item names 610A. The fine-tuned language model 600 generates pair scores 615 for the set of receipt labels 605A and the item names 610A and a set of optimized item pairs 620 corresponding to the pair scores. The pair scores 615 represent similarities between the receipt labels 605A and item names 610A for a customer order. In some embodiments, the fine-tuned language model 600 may generate pair scores 615 for each item name 610A with respect to each receipt label 605A (e.g., every pair is evaluated) and may use the pair scores to determine the optimized item pairs 620.

Similar to determining label-name pairs for training data, the fine-tuned language model 600 may select optimized item pairs 620 as the most-likely pairs for the set of receipt labels 605A and the set of item names 610A. Each receipt label and 605A and each item name 610A may be selected once for the optimized item pairs 620 and are selected based on the pair scores 615. In some embodiments, the optimized item pairs 620 are selected to maximize the overall pair score for the customer order. The overall pair score may be further used by the online concierge system 140 to evaluate whether the customer order is correctly fulfilled. In other embodiments, the optimized item pairs 620 may be selected in other ways, e.g., with a greedy algorithm, excluding pairs below a threshold pair score, or the like.

The online concierge system 140 may determine, based on the optimized item pairs 620, whether items from the set of item names 610A correspond to purchased items represented by the receipt labels 605A. Items that are unpaired may indicate that one or more receipt label items do not correctly fulfill the customer order, or that one or more items were missed during fulfillment of the customer order. As such, the online concierge system 140 may identify receipt labels 605A or item names 610A that are not included in the optimized item pairs 620 as a discrepancy in the customer order that may require attention and/or further actions to be taken.

Similarly, low pair scores 615 for the set of receipt labels 605A and item names 610A (or a low total pair score for the customer order) may also be indicative of a discrepancy in the fulfillment of the customer order, even if all receipt labels and item names are included in the optimized item pairs 620. In some embodiments, the online concierge system 140 sets a threshold value (e.g., 0.5, 0.25) below which a pair score 615 may be flagged as indicating a discrepancy for the customer order. In other embodiments, the online concierge system 140 may apply the fine-tuned language model 600 to perform one or more additional tasks responsive to determining that a pair score is below a threshold value and/or that one or more items are left unpaired.

FIG. 6B is an example for applying a fine-tuned language model 600 to translate a set of receipt labels 605B to predicted item names 625. The predicted item names 625 represent a prediction of an item name corresponding to the receipt label 605B as stored by the online concierge system 140. For example, the predicted item names 625 may be expanded or lengthened versions of a receipt label 605B, and may include different formatting standards, as discussed in conjunction with FIG. 3B.

The online concierge system 140 receives a set of receipt labels 605B extracted from a receipt image corresponding to a customer order. In some embodiments, the online concierge system 140 applies the fine-tuned language model 600 to translate the set of receipt labels 605B responsive to generating optimized item pairs for a customer order, as discussed in conjunction with FIG. 6A, and determining that one or more receipt labels are left unpaired in the optimized item pairs. The fine-tuned language model 600 may translate a subset of receipt labels 605B (e.g., receipt labels left unpaired in optimized item pairs) to predicted item names 625, enabling the online concierge system 140 to identify item names that correspond in particular to unpaired receipt labels and thus to determine whether a discrepancy indicates that the customer order is fulfilled incorrectly.

The online concierge system 140 compares the predicted item names 625 to a set of item names 610B. In some embodiments, the set of item names 610B correspond to an associated customer order, and may be unpaired or paired in optimized item pairs by the fine-tuned language model 600. In other embodiments, the set of item names 610B are provided by the online concierge system 140, e.g., from a data store 240, and may represent possible item names within the online concierge system, including, for example, replacement items, incorrectly purchased items, items purchased for other orders, or the like.

In some embodiments, the online concierge system 140 determines pair scores for the predicted item names 625 and set of item names 610B. Pair scores above a threshold value may indicate that the predicted item names 625 correspond to the set of item names 610B; conversely, pair scores below a threshold value indicate that the predicted item names do not correspond to the item names, and may be identified as a discrepancy requiring further action (e.g., manual review). High pair scores for predicted item names with respect to item names included in the customer order may suggest that the customer order was correctly fulfilled, while high pair scores for predicted item names with respect to item names not included in the customer order (or low pair scores with respect to item names included in the customer order) may suggest that a replacement item was selected for the customer order or that an item was purchased that incorrectly fulfills the customer order. In other embodiments, the online concierge system 140 may use other methods to determine discrepancies between the predicted item names 625 and the set of item names 610B.

FIG. 6C is an example for applying a fine-tuned language model 600 to translate a set of item names 610C to predicted receipt labels 635. The fine-tuned language model 600 is trained to generate predicted receipt labels 635 based on the input set of item names 610C. The predicted receipt labels 635 represent a prediction of a receipt label corresponding to the item name 610C as it would appear on a receipt image. For example, the predicted receipt labels 635 may be compressed versions of an item name 610C, and may include different formatting standards, as discussed in conjunction with FIG. 3B.

The online concierge system 140 receives a set of item names 610C from a customer order of the online concierge system. In some embodiments, the online concierge system 140 applies the fine-tuned language model 600 to translate the set of item names 610C responsive to generating optimized item pairs for a customer order, as discussed in conjunction with FIG. 6A, and determining that one or more item names are left unpaired in the optimized item pairs. The fine-tuned language model 600 may translate a subset of item names 610C (e.g., item names left unpaired in optimized item pairs) to predicted receipt labels 635, enabling the online concierge system 140 to more directly compare receipt labels 605C with predicted receipt labels 635 and thus to determine whether a discrepancy indicates that the customer order is fulfilled incorrectly.

The online concierge system 140 receives a receipt image corresponding to the customer order, the receipt image including a set of receipt labels 605C. The online concierge system 140 compares the set of receipt labels 605C to the predicted receipt labels 635 output by the fine-tuned language model 600. In some embodiments, the online concierge system 140 may compare a set of receipt labels 605C that are left unpaired in previously determined optimized item pairs, e.g., as per FIG. 6A, and the predicted receipt labels 635.

In some embodiments, the online concierge system 140 determines pair scores for the predicted receipt labels 635 and set of receipt labels 605C. Pair scores above a threshold value may indicate that the predicted receipt labels 635 correspond to the set of receipt labels 605C; conversely, pair scores below a threshold value indicate that the predicted receipt labels do not correspond to the receipt labels, and may be identified as a discrepancy requiring further action (e.g., manual review). High pair scores for predicted receipt labels with respect to receipt labels from the receipt may suggest that the customer order was correctly fulfilled, while low pair scores may suggest that a replacement item was selected for the customer order or that one or more items requested in the customer order were not purchased. In other embodiments, the online concierge system 140 may use other methods to determine discrepancies between the predicted receipt labels 635 and the set of receipt labels 605C of the customer order.

As discussed previously, when a discrepancy is identified by one or more of the example methods described in FIGS. 6A-C, the online concierge system 140 may perform various actions to further confirm whether the discrepancy is caused by the corresponding customer order being incorrectly fulfilled, or to correct an incorrect fulfillment. For example, the online concierge system 140 flags the customer order for manual review by an administrator of the online concierge system, a picker associated with the customer order, or a customer associated with the customer order. Alternately, the online concierge system 140 may transmit an alert to a device of a picker associated with the customer order (e.g., a text message notification, an email, and/or an automated phone call). In another embodiment, the online concierge system 140 may determine that the discrepancy is an error and may retrain (e.g., further fine-tune) the language model by the machine-learning training module 230 using updated or additional training data.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example; comparing an output of the machine-learning model to the label associated with the training example; and updating weights associated for the machine-learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method performed by an online concierge system comprising:
- identifying a plurality of orders, each order including an associated set of item names and an associated set of receipt labels extracted from an associated processed receipt image using a text recognition algorithm;
- generating, for each order in the plurality of orders, using a trained language model, a set of optimized label-name pairs for the order by fuzzy matching the associated set of item names and the associated set of receipt labels;
- for each order in the plurality of orders:
  - generating statistical association scores for a set of candidate label-name pairs based on receipt-order item pairs, the statistical association scores describing a relative likelihood that a receipt label in the label-name pair occurs with an item name in the label-name pair relative to each of the generated sets of optimized label-name pairs for the other orders in the plurality of orders;
  - selecting a set of training label-name pairs from the set of candidate label-name pairs based on the statistical association scores, wherein selecting a set of training label-name pairs comprises filtering the candidate label-name pairs to remove label-name pairs having statistical association scores below a threshold value; and
  - fine-tuning parameters of the trained language model based on the selected training label-name pairs;
- receiving a new receipt associated with a new order, wherein the new order includes a list of target items;
- extracting a new set of receipt labels from the processed new receipt using the text recognition algorithm;
- providing a receipt label from the new set of receipt labels as input to the fine-tuned language model;
- receiving, from the fine-tuned language model, a predicted item name associated with the receipt label; and
- identifying a target item from the list of target items that corresponds to the predicted item name.

2. The method of claim 1, wherein generating a set of optimized label-name pairs for the order further comprises generating fuzzy matching scores for each receipt label with each item name and pairing label-name pairs based on the fuzzy matching scores.

3. The method of claim 1, wherein fine-tuning parameters of the trained language model with the training label-name pairs comprises training the language model to receive a receipt image comprising receipt labels and to generate corresponding predicted item names.

4. The method of claim 1, wherein receiving a predicted item name associated with the receipt label is based on fuzzy matching scores for the item names and receipt labels.

5. The method of claim 1, wherein the language model is a large language model.

6. The method of claim 1, wherein selecting a set of training label-name pairs from the set of candidate label-name pairs based on the statistical association scores comprises selecting label-name pairs having a statistical association score above a threshold value.

7. A computer program product comprising a non-transitory computer-readable storage medium having instructions encoded thereon that, when executed by a processor, cause the processor to perform steps comprising:
- identifying a plurality of orders, each order including an associated set of item names and an associated set of receipt labels extracted from an associated processed receipt image using a text recognition algorithm;
- generating, for each order in the plurality of orders, using a trained language model, a set of optimized label-name pairs for the order by fuzzy matching the associated set of item names and the associated set of receipt labels;
- for each order in the plurality of orders:
  - generating statistical association scores for a set of candidate label-name pairs based on receipt-order item pairs, the statistical association scores describing a relative likelihood that a receipt label in the label-name pair occurs with an item name in the label-name pair relative to each of the generated sets of optimized label-name pairs for the other orders in the plurality of orders;
  - selecting a set of training label-name pairs from the set of candidate label-name pairs based on the statistical association scores, wherein selecting a set of training label-name pairs comprises filtering the candidate label-name pairs to remove label-name pairs having statistical association scores below a threshold value; and
  - fine-tuning parameters of the trained language model based on the selected training label-name pairs;
- receiving a new receipt associated with a new order, wherein the new order includes a list of target items;
- extracting a new set of receipt labels from the processed new receipt using the text recognition algorithm;

providing a receipt label from the new set of receipt labels as input to the fine-tuned language model;

receiving, from the fine-tuned language model, a predicted item name associated with the receipt label; and identifying a target item from the list of target items that corresponds to the predicted item name.

8. The non-transitory computer-readable storage medium of claim 7, wherein generating a set of optimized label-name pairs for the order further comprises generating fuzzy matching scores for each receipt label with each item name and pairing label-name pairs based on the fuzzy matching scores.

9. The non-transitory computer-readable storage medium of claim 7, wherein fine-tuning parameters of the trained language model with the training label-name pairs comprises training the language model to receive a receipt image comprising receipt labels and to generate corresponding predicted item names.

10. The non-transitory computer-readable storage medium of claim 7, wherein receiving a predicted item name associated with the receipt label is based on fuzzy matching scores for the item names and receipt labels.

11. The non-transitory computer-readable storage medium of claim 10, wherein the language model is a large language model.

12. The non-transitory computer-readable storage medium of claim 7, wherein selecting a set of training label-name pairs from the set of candidate label-name pairs based on the statistical association scores comprises selecting label-name pairs having a statistical association score above a threshold value.

13. A computer program product, comprising:

a processor that executes instructions; and a non-transitory computer readable storage medium having instructions executable by the processor for:

identifying a plurality of orders, each order including an associated set of item names and an associated set of receipt labels extracted from an associated processed receipt image using a text recognition algorithm;

generating, for each order in the plurality of orders, using a trained language model, a set of optimized label-name pairs for the order by fuzzy matching the associated set of item names and the associated set of receipt labels;

for each order in the plurality of orders:

generating statistical association scores for a set of candidate label-name pairs based on receipt-order item pairs, the statistical association scores describing a relative likelihood that a receipt label in the label-name pair occurs with an item name in the label-name pair relative to each of the generated sets of optimized label-name pairs for the other orders in the plurality of orders;

selecting a set of training label-name pairs from the set of candidate label-name pairs based on the statistical association scores, wherein selecting a set of training label-name pairs comprises filtering the candidate label-name pairs to remove label-name pairs having statistical association scores below a threshold value; and fine-tuning parameters of the trained language model based on the selected training label-name pairs;

receiving a new receipt associated with a new order, wherein the new order includes a list of target items;

extracting a new set of receipt labels from the processed new receipt using the text recognition algorithm;

providing a receipt label from the new set of receipt labels as input to the fine-tuned language model;

receiving, from the fine-tuned language model, a predicted item name associated with the receipt label; and identifying a target item from the list of target items that corresponds to the predicted item name.

14. The computer program product of claim 13, wherein generating a set of optimized label-name pairs for the order further comprises generating fuzzy matching scores for each receipt label with each item name and pairing label-name pairs based on the fuzzy matching scores.

* * * * *